UNITED STATES PATENT OFFICE.

FILIP KACER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

COMPOUND OF THE ANTHRACENE SERIES AND PROCESS OF MAKING SAME.

932,290. Specification of Letters Patent. Patented Aug. 24, 1909.

No Drawing. Application filed March 24, 1908. Serial No. 423,004.

*To all whom it may concern:*

Be it known that I, FILIP KAČER, doctor of philosophy and chemist, subject of the King of Prussia, residing at Mannheim, Germany, have invented new and useful Improvements in Compounds of the Anthracene Series and Processes of Making the Same, of which the following is a specification.

In the specification of the application for British Letters Patent No. 16,775/07 is described the production of a new class of compounds termed 2-methyl-anthrapyridon compounds of which the simplest member has a composition corresponding to the formula

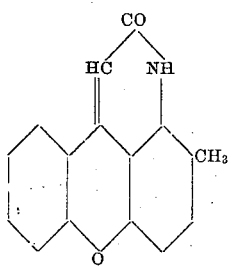

I have found that 2-methyl-anthrapyridon compounds which contain halogen in position 4 can be made to react with aromatic amins of the benzene and naphthalene series and to yield 4-arylamino-2-methyl-anthrapyridon compounds. I have also found that anthrapyridon compounds which contain a halogen, or other group, instead of the methyl group, in position 2, and which also contain halogen in position 4, will also react with aromatic amins of the benzene and naphthalene series and yield 4-aryl-amino-anthrapyridon compounds. The reaction can, if found desirable, be carried out in the presence of sodium acetate, or of other compound which will assist in the reaction.

The aryl-amino-anthrapyridon compounds obtained as hereinbefore described can, by treatment with sulfonating agents, be converted into coloring matters which dye wool red shades of excellent fastness and also possess the further following characteristic properties. They are soluble in water, yielding yellow-red to red-violet solutions; they are insoluble in alcohol, ether, benzene, and glacial acetic acid. Their solutions in concentrated sulfuric acid are from yellowish red to red, and the color is not altered by the addition of boric acid.

The following examples will serve to illustrate further the nature of my invention and how it can be carried into practical effect, but my invention is not confined to these examples. The parts are by weight.

Example 1: Boil together, in a reflux apparatus, for from four (4), to five (5), hours, eight (8) parts of paratoluidin, one (1) part of 4-chlor-2-methyl-anthrapyridon and one (1) part of anhydrous sodium acetate, and then add eight (8) parts of alcohol. When the mass has become cold, filter off the product and wash it with alcohol and water and then dry it, whereupon 4-paratoluido-2-methyl-anthrapyridon is obtained in the form of red-brown crystals. In order to sulfonate this compound, dissolve one (1) part thereof in ten (10) parts of sulfuric acid monohydrate, and heat at a temperature of from forty (40), to fifty (50), degrees centigrade until a test portion shows that the mass has become completely soluble in water. Then pour the mixture, while stirring, into one hundred (100) parts of water, and filter off the coloring matter and wash it with a solution of common salt. It can either be dried, or be used directly in the form of paste.

Example 2: Boil together, in a reflux apparatus, eight (8) parts of paratoluidin, one part (1) part of 2.4-dichlor-anthrapyridon and one (1) part of anhydrous sodium acetate. When the reaction is complete, add twelve (12) parts of alcohol. Work up the product and convert it into its sulfonic acid as described in the foregoing Example 1. A similar procedure can be employed when other aromatic amins of the benzene, or naphthalene, series are used.

Now what I claim is:

1. The process of producing compounds of the anthracene series by condensing with an aromatic amin of the benzene, or naphthalene, series a 4-halogenated anthrapyridon compound which is substituted in position 2.

2. The process of producing coloring matters of the anthracene series by condensing with an aromatic amin of the benzene, or naphthalene, series a 4-halogenated anthrapyridon compound which is substituted in position 2 and then sulfonating the compound so obtained.

3. The process of producing coloring matters of the anthracene series by condensing paratoluidin with 4-chlor-2-methyl-anthrapyridon and treating the product so obtained with a sulfonating agent.

4. As new articles of manufacture the compounds of the anthracene series which can be obtained by condensing with an aromatic amin of the benzene, or naphthalene, series, a 4-halogenated anthrapyridon compound which is substituted in position 2, which compounds in the form of their sulfonic acids dye wool red shades and are soluble in water yielding yellow-red to red-violet solutions, are insoluble in alcohol, ether, benzene, and glacial acetic acid, and soluble in concentrated sulfuric acid yielding yellowish red to red solutions which are unaltered by the addition of boric acid.

5. As a new article of manufacture 4-toluylamino-2-methylanthrapyridon-sulfonic acid which dyes wool red shades, yields a violet-red solution in water, is insoluble in alcohol, ether, benzene, and glacial acetic acid, and soluble in concentrated sulfuric acid yielding a violet-red solution which is unaltered by the addition of boric acid.

In testimony whereof I have hereunto set my hand in the presence of two subscribing witnesses.

FILIP KAČER.

Witnesses:
J. ALEC. LLOYD,
JOS. H. LEUTE.